US011429610B2

(12) United States Patent
Cheng et al.

(10) Patent No.: US 11,429,610 B2
(45) Date of Patent: Aug. 30, 2022

(54) SCALED-OUT QUERY EXECUTION ENGINE

(71) Applicant: SAP SE, Walldorf (DE)

(72) Inventors: Xun Cheng, Dublin, CA (US); Zhen Tian, Walldorf (DE); Yuncong Qiao, Walldorf (DE); Faming Qu, Walldorf (DE); Paul Willems, Heidelberg (DE); Hongyong Lu, Walldorf (DE); Yanxin Luo, Walldorf (DE); Nitesh Maheshwari, Dublin, CA (US)

(73) Assignee: SAP SE, Walldorf (DE)

( * ) Notice: Subject to any disclaimer, the term of this patent is extended or adjusted under 35 U.S.C. 154(b) by 99 days.

(21) Appl. No.: 16/837,843

(22) Filed: Apr. 1, 2020

(65) Prior Publication Data
US 2021/0311946 A1 Oct. 7, 2021

(51) Int. Cl.
G06F 16/2453 (2019.01)
(52) U.S. Cl.
CPC .............................. G06F 16/24549 (2019.01)
(58) Field of Classification Search
CPC .................. G06F 16/24549; G06F 16/2471
See application file for complete search history.

(56) References Cited

U.S. PATENT DOCUMENTS

| 7,984,043 | B1* | 7/2011 | Waas | G06F 16/8358 707/718 |
| 2009/0234799 | A1* | 9/2009 | Betawadkar-Norwood | G06F 16/2471 |
| 2014/0156632 | A1* | 6/2014 | Yu | G06F 16/24545 707/713 |
| 2016/0085828 | A1* | 3/2016 | Nguyen | G06F 16/2471 707/770 |
| 2017/0262516 | A1* | 9/2017 | Horowitz | G06F 16/258 |
| 2017/0262517 | A1* | 9/2017 | Horowitz | G06F 16/254 |
| 2017/0286510 | A1* | 10/2017 | Horowitz | G06F 16/284 |

* cited by examiner

Primary Examiner — William Spieler
(74) Attorney, Agent, or Firm — Mintz Levin Cohn Ferris Glovsky and Popeo, P.C.

(57) ABSTRACT

A method, a system, and a computer program product for generating a query executable plan. A query requiring access to data stored in a database system is received. Based on the received query, a query execution plan having a plurality of query execution pipelines is generated. Each query execution pipeline in the plurality of query execution pipelines is configured to execute a plurality of operations in a predetermined order associated with each query execution pipeline. The generated query execution plan is fragmented into a plurality of fragments. Each fragment has one or more query execution pipelines in the plurality of query execution pipelines. The received query is executed by executing each fragment in the plurality of fragments.

20 Claims, 14 Drawing Sheets

SCALED-OUT QUERY EXECUTION ENGINE

TECHNICAL FIELD

This disclosure relates generally to data processing and, in particular, to scaled-out query execution engines capable of generating and executing distribute query execution plans.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some implementations, the current subject matter relates to a computer-implemented process for generating a query executable plan. The process may include receiving a query requiring access to data stored in a database system, and generating, based on the received query, a query execution plan having a plurality of query execution pipelines. Each query execution pipeline in the plurality of query execution pipelines may be configured to execute a plurality of operations in a predetermined order associated with each query execution pipeline. The process may also include fragmenting the generated query execution plan into a plurality of fragments. Each fragment may have one or more query execution pipelines in the plurality of query execution pipelines. Further, the process may include executing the received query by executing each fragment in the plurality of fragments.

In some implementations, the current subject matter may include one or more of the following optional features. The received query may require access to the data stored in different locations in the database system. One or more locations in the database system may be considered a data consuming location and one or more other locations in the database system may be considered a data producing location. One or more locations may include one or more nodes in a distributed database system.

In some implementations, the plurality of fragments may include a root fragment and one or more non-root fragments. The root fragment may be configured to be executed at the data consuming location of the database system and may be further configured to receive data resulting from execution of the non-root fragments at the data producing location of the database system.

In some implementations, execution of the root fragment may be configured to trigger execution of the non-root fragments. Further, execution of a query execution pipeline of the root fragment may include executing a receiving operator to receive data queried by the received query from one or more non-root fragments. Moreover, execution of a query execution pipeline of the non-root fragment may include executing a transmitting operator to transmit data queried by the received query to the root fragment. In some implementations, execution of a query execution pipeline of the non-root fragment may include executing a receiving operator to receive data queried by the received query from one or more non-root fragments. Additionally, each non-root fragment may be configured to be executed asynchronously.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
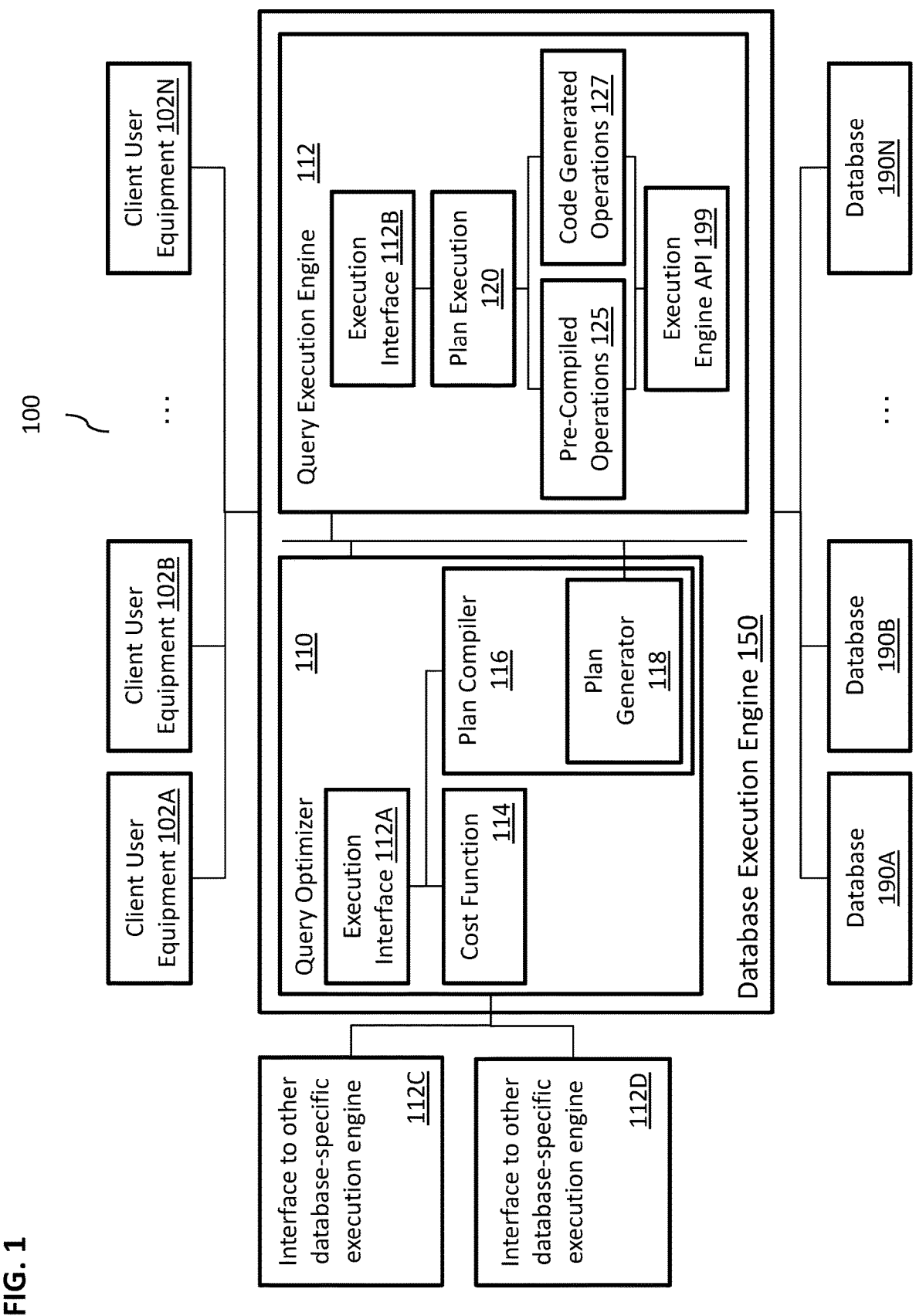
FIG. 1 illustrates an exemplary system, according to some implementations of the current subject matter.

To address these and potentially other deficiencies of currently available solutions, one or more implementations of the current subject matter relate to methods, systems, articles of manufacture, and the like that can, among other possible advantages, provide scaled-out query execution engine.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 illustrates an exemplary system 100, according to some implementations of the current subject matter. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

Figure 8:
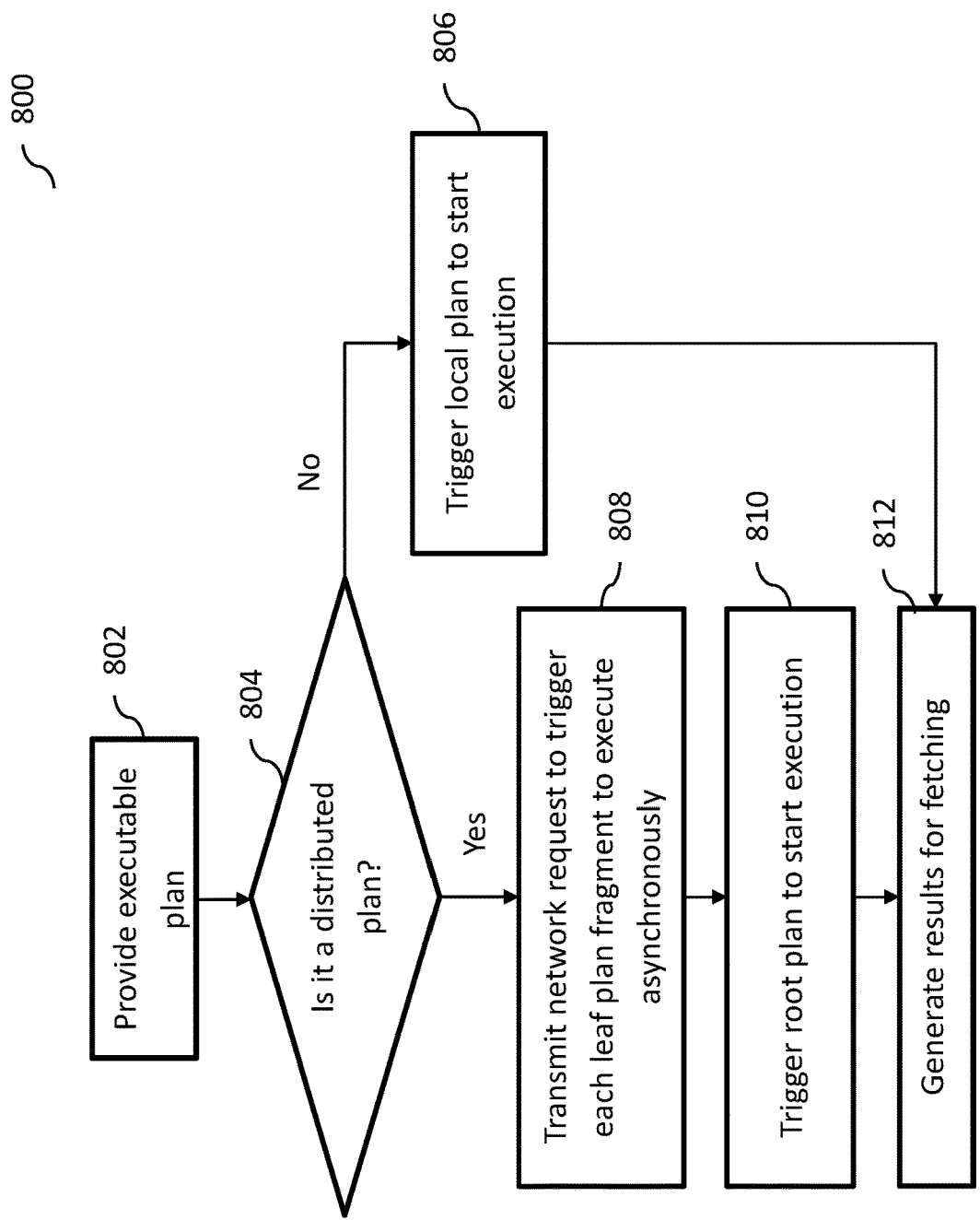
FIG. 8 illustrates an exemplary process for triggering generated executable query plan, according to some implementations of the current subject matter.
Figure 9:
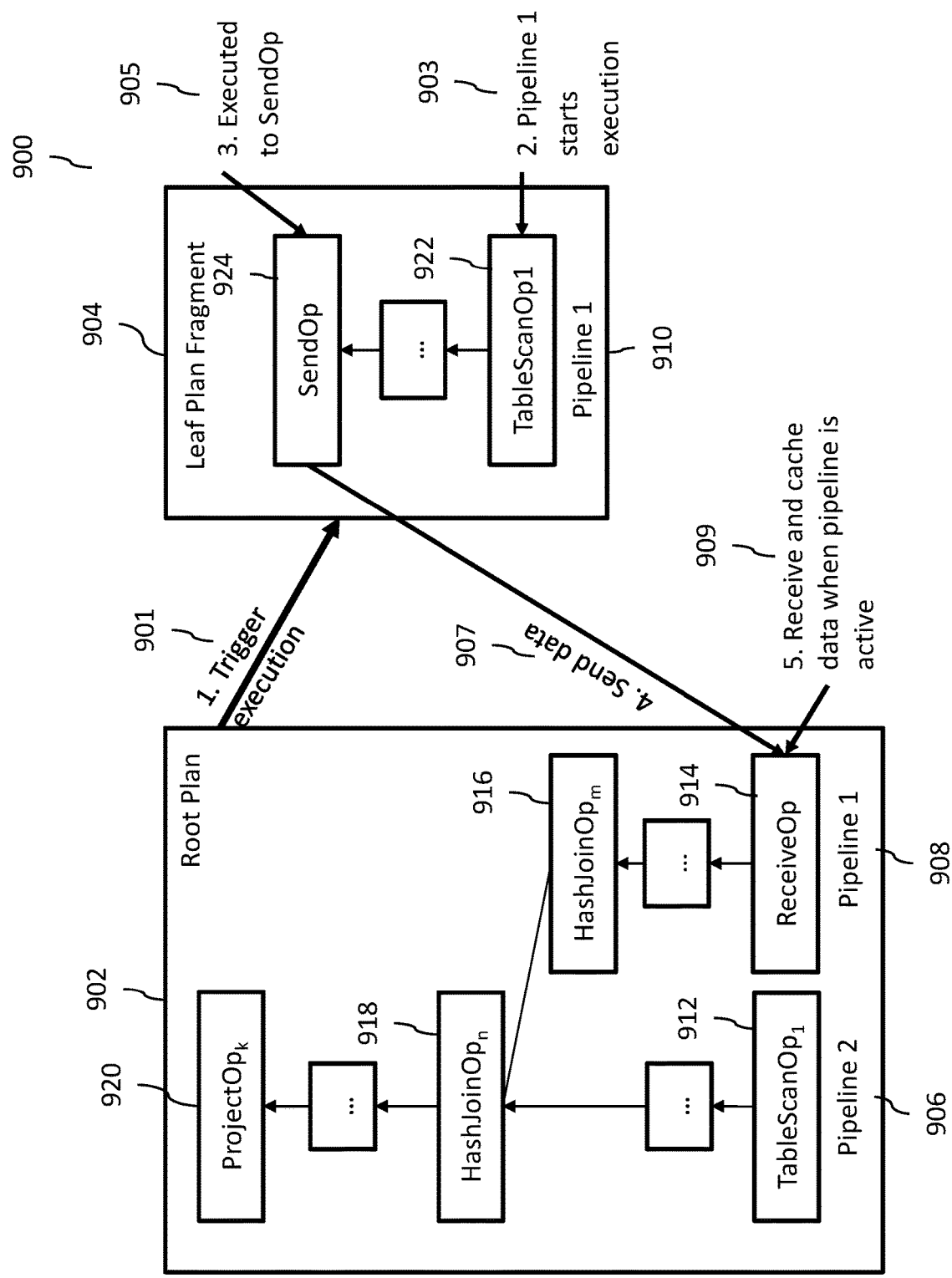
FIG. 9 illustrates an exemplary process for execution data receiving and data transmission operations during execution of a distributed executable query plan, according to some implementations of the current subject matter.
Figure 10:
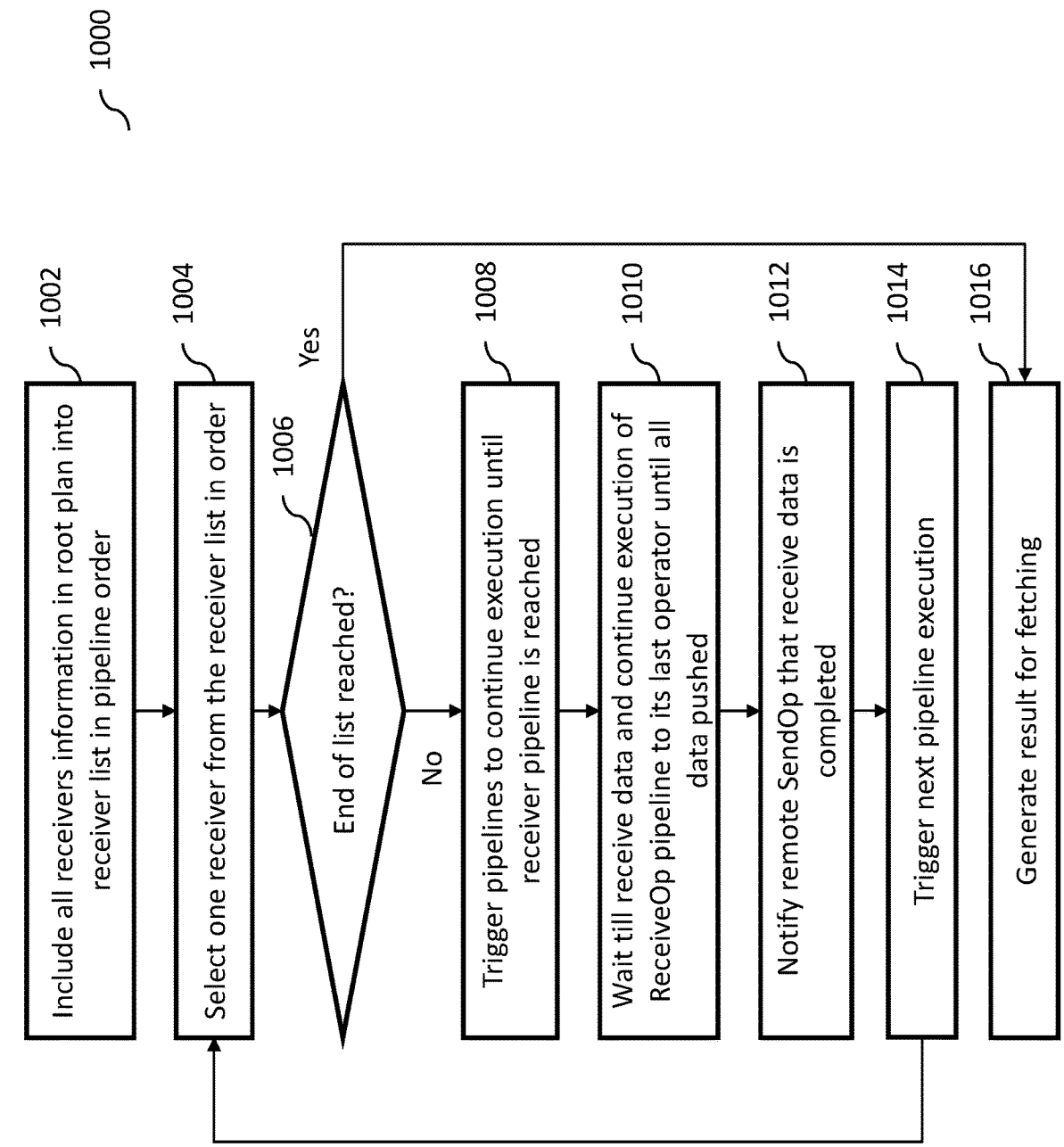
FIG. 10 illustrates an exemplary process for executing a distributed root plan, according to some implementations of the current subject matter.

In some implementations, the query execution engine may be configured to generate a push model pipeline-based executable plan from a global SQL optimizer plan and then trigger execution of pipeline to obtain a result of the query. The current subject matter's query execution engine may be configure to generate result rows as soon as the data is obtained from a database and/or any other data location. To support query execution involving more than one data location for the execution engine in a scaled-out computing system (e.g., such as HANA computing system, as described below and available from SAP SE, Walldorf, Germany), the current subject matter may be configured to execute a distributed query processing generating a pipeline-based distributed query executable plan and then triggering and controlling execution of the generated distributed query executable plan. FIGS. 2-7 illustrate generation of pipeline-based distributed query executable plan. FIGS. 8-10 illustrate triggering and controlling execution of the generated distribute query executable plan.

Figure 2:
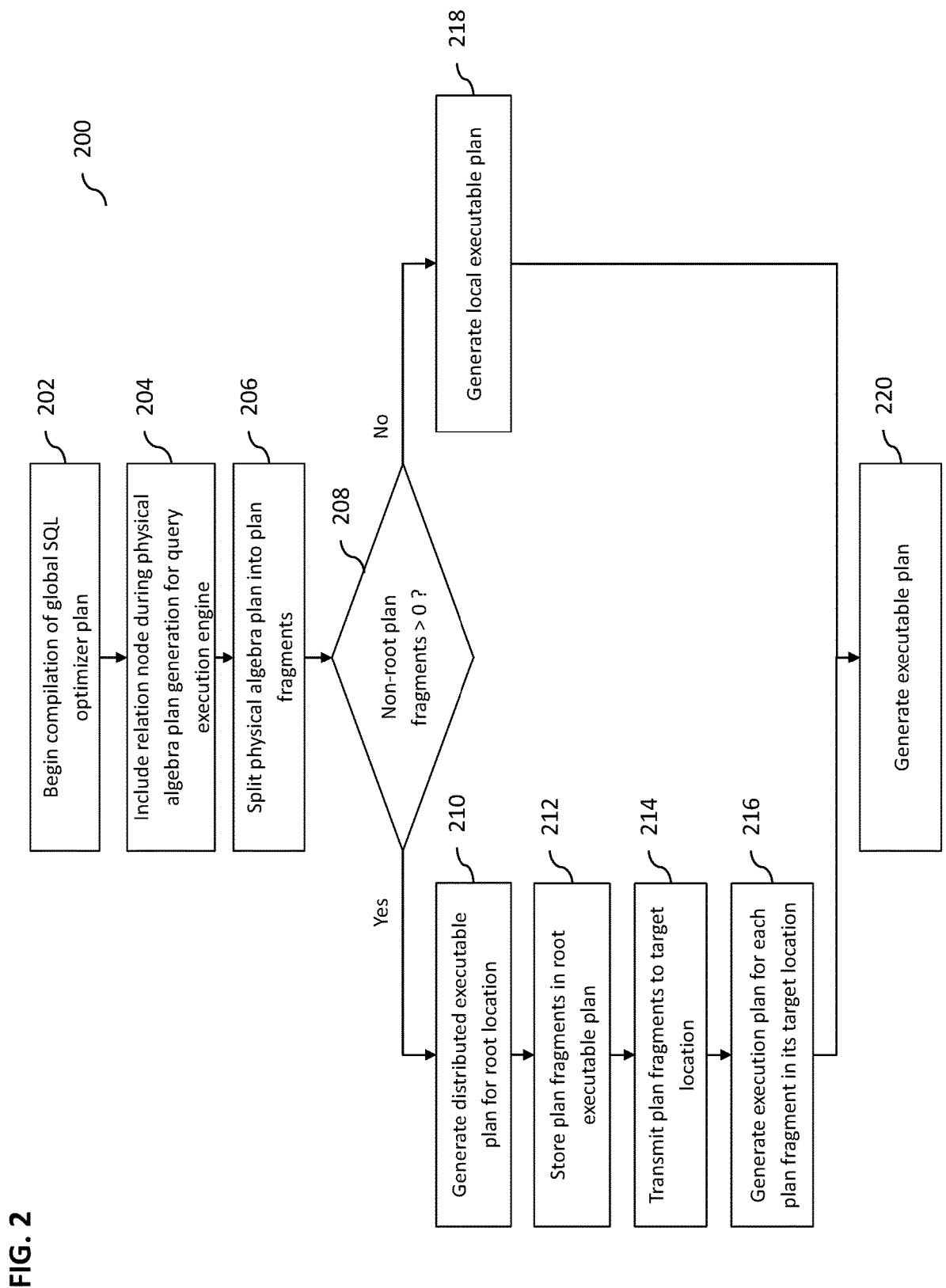
FIG. 2 illustrates an exemplary process for generating pipeline-based distributed query executable plan, according to some implementations of the current subject matter.

FIG. 2 illustrates an exemplary process 200 for generating pipeline-based distributed query executable plan, according to some implementations of the current subject matter. The process 200 may be performed by one or more components of the system 100 shown in FIG. 1. During execution of the process 200, a query optimizer plan may be configured to be complied into an executable plan for execution by the query execution engine 112, as shown in FIG. 1.

Figure 3:
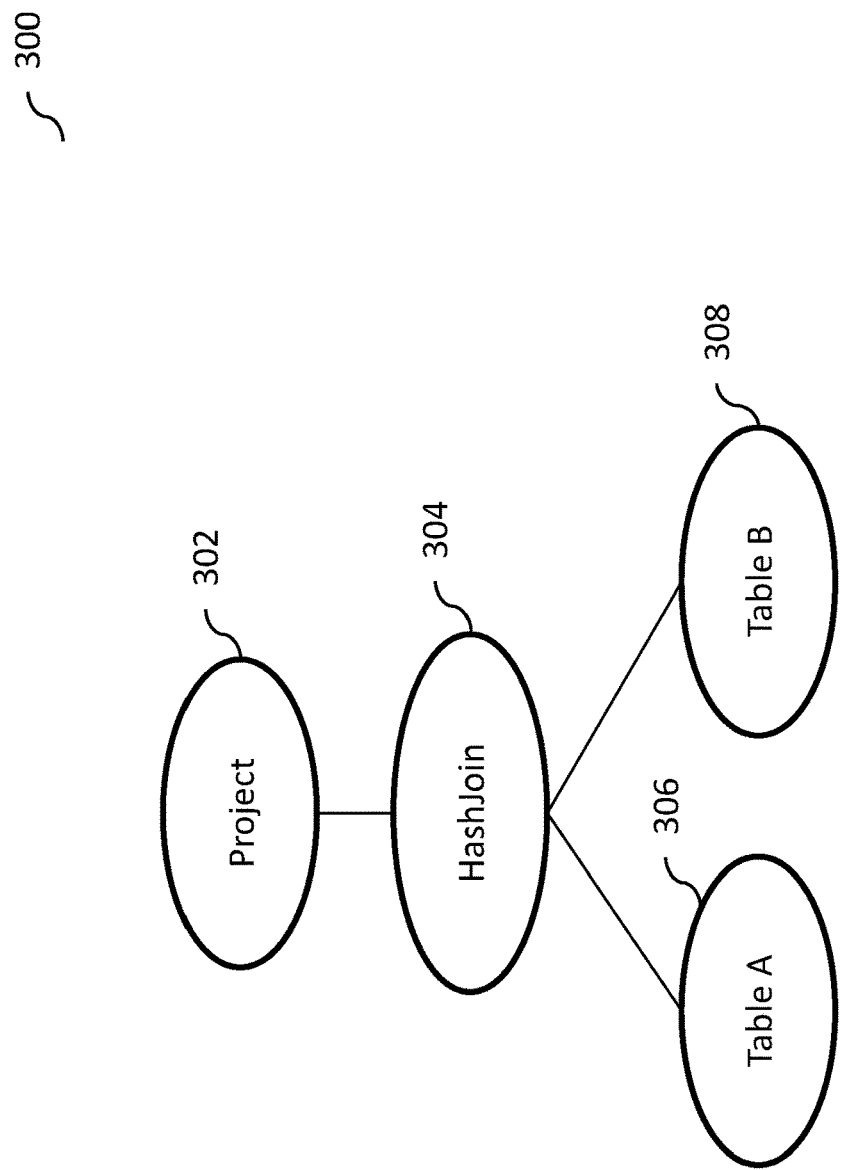
FIG. 3 illustrates an exemplary global SQL optimizer plan corresponding to a physical query plan with an algebra tree, according to some implementations of the current subject matter.

To illustrate process 200, assume that the following exemplary query may need to be executed
 SELECT*from A, B where A.a=B.a
The query is a SELECT query that involves a join of two Tables A and B. In some exemplary implementations, Table A may be stored in location 1 and Table B may be stored in location 2. The join and project operators may be performed at location 1. FIG. 3 illustrates an exemplary global SQL optimizer plan corresponding to a physical query plan with an algebra tree 300. The tree 300 may be configured to include a project operator 302, a HashJoin operator 304, a Table A 306 and a Table B 308. The tree 300 may be a representation with location information for each different type of relation node such as join, table, etc. The tree 300 may be configured to serve as an input to the query execution engine 112 from the query optimizer component 110 (shown in FIG. 1), at 202, as shown in FIG. 2. As can be understood, any other types of queries, operators, etc. may be generated and/or executed. The discussion herein is provided for ease of illustration only.

At 204, a relation node or a transfer node or an exchange node (which may be used interchangeably herein) may be configured to be included during generation of a physical algebra plan for the query execution engine 110. The relation node may be used for generation of the distributed query executable plan. In some implementations, when global SQL optimizer plan is converted into the physical algebra tree 300 for query execution engine 112, the relation node may be inserted between parent and child data nodes that may be located in different locations. This means that any data exchange between the parent and child nodes using a network (connecting their locations) may occur during a later execution time. The relation node may be configured to store information for all locations that generate data from relation node's child node, and all locations that consume data for relation node's parent node. The relation node may also serve as a map between the data producing location and data consuming location.

Figure 4:
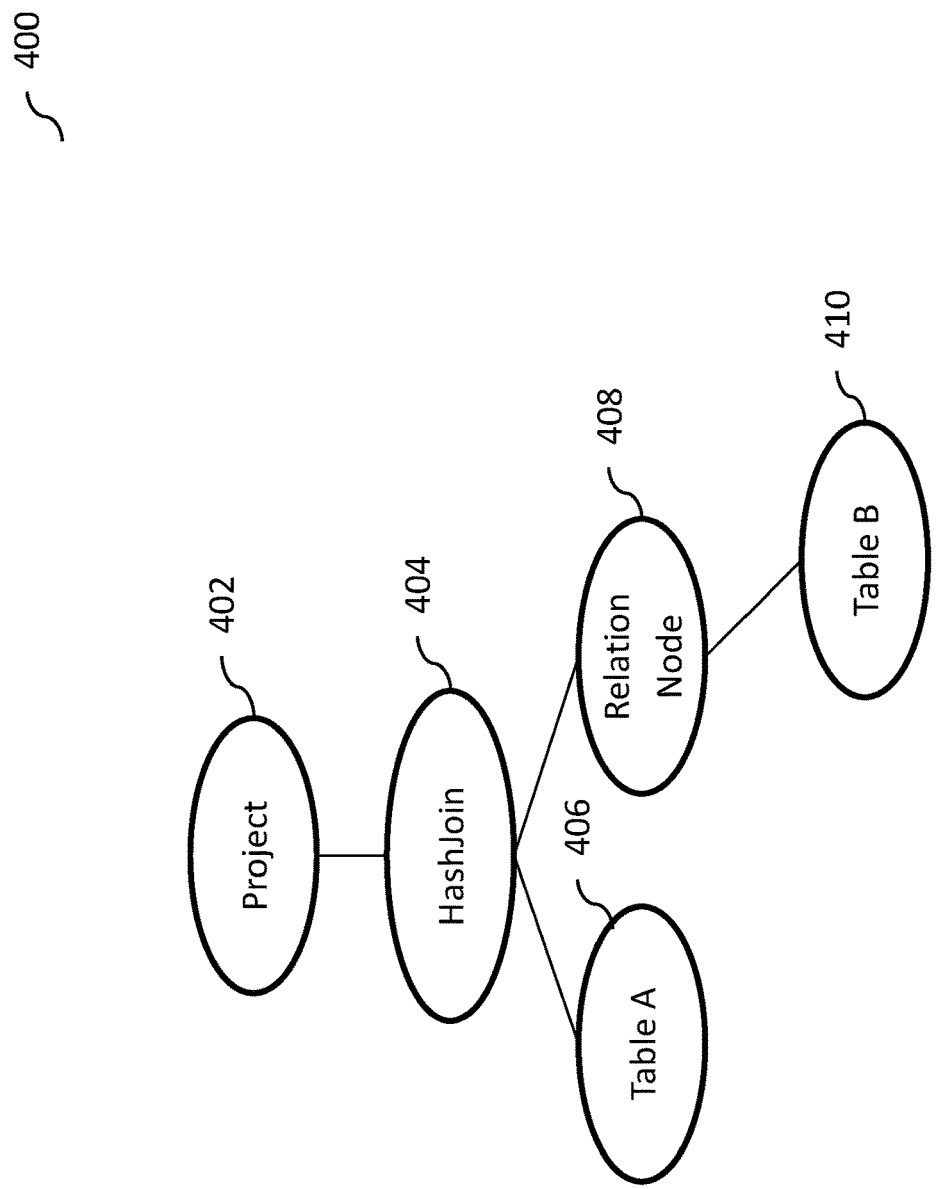
FIG. 4 illustrates an exemplary tree structure that includes a relation node, according to some implementations of the current subject matter.

FIG. 4 illustrates an exemplary tree structure 400 that includes a relation node, according to some implementations of the current subject matter. As shown in FIG. 4, the relation node 408 may be inserted between the HashJoin node 404 and Table B node 410. This may be done because the HashJoin node 404 may be located at location 1 and Table B node 410 may be located at location 2, where data from the producer location 2 for Table B may need to be transmitted to consumer location 1 for the purposes of serving as input to the HashJoin node 404.

Figure 5:
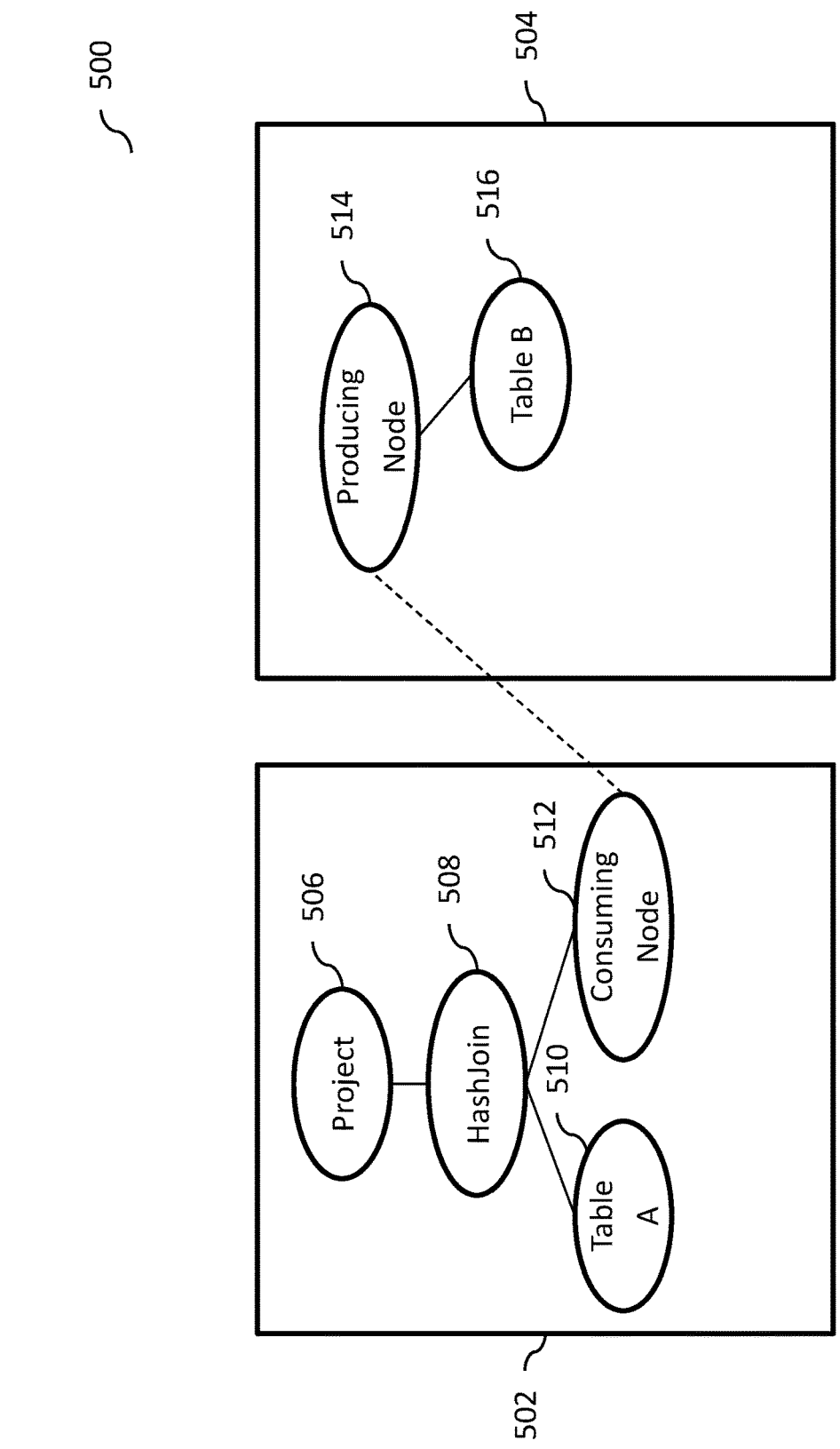
FIG. 5 illustrates an exemplary physical algebra plan, according to some implementations of the current subject matter.

Referring back to FIG. 2, at 206, the generated physical algebra plan may be split into one or more plan fragments. In some implementations, the plan may be split based on data producing and data consuming locations. FIG. 5 illustrates an exemplary physical algebra plan 500 that has been split into two locations 502 and 504, where location 502 may be configured to include a data producing location, and location 504 may be configured to include data consuming location. To perform the splitting, the relation node 408 (as shown in FIG. 4) may be split into and replaced by a data consuming node 512 and a data producing node 514. The data consuming node 512 may be configured to be placed at location 502 and the data producing node 514 may be configured to be placed at location 504. The data producing node 514 may be co-located with the Table B 516 that may be used for data production purposes. The data consuming node 512 may be co-located with the HashJoin node 508 (being linked to the parent project node 506) so that it can provide appropriate input data for a join with data in Table A 510. Once the physical algebra plan has been split, as shown in FIG. 5, the location 502 may be referred to as a root plan fragment 502, which may be configured to receive SQL statements from a user/client, and the location 504 may be referred as a non-root plan fragment 504.

At 208, as shown in FIG. 2, the process 200 may be configured to determine whether there exist non-root plan fragments. If there are no non-root plan fragments, the query execution engine 112 may be configured to generate a local (i.e., for that particular location) query executable plan, at 218, which may be used as the query executable plan, at 220, for execution of a query.

However, if there are non-root plan fragments, then the processing proceeds to 210, where the process 200 may be configured to generate a distributed query executable plan for the root plan fragment (e.g., root plan fragment 502). The distributed query executable plan for the root fragment may be configured to include one or more executable operators that may be used to transmit or send data (e.g., SendOp) and/or receive data (e.g., ReceiveOp). The data transmission operator may be generated from producing node and the data receiving operator may be generated from the data consuming node during generation of the executable plan. These operators may be configured to coordinate transfer of data from a source location (e.g., data producing location) to a target location (e.g., data consuming location) during execution time.

Figure 6:
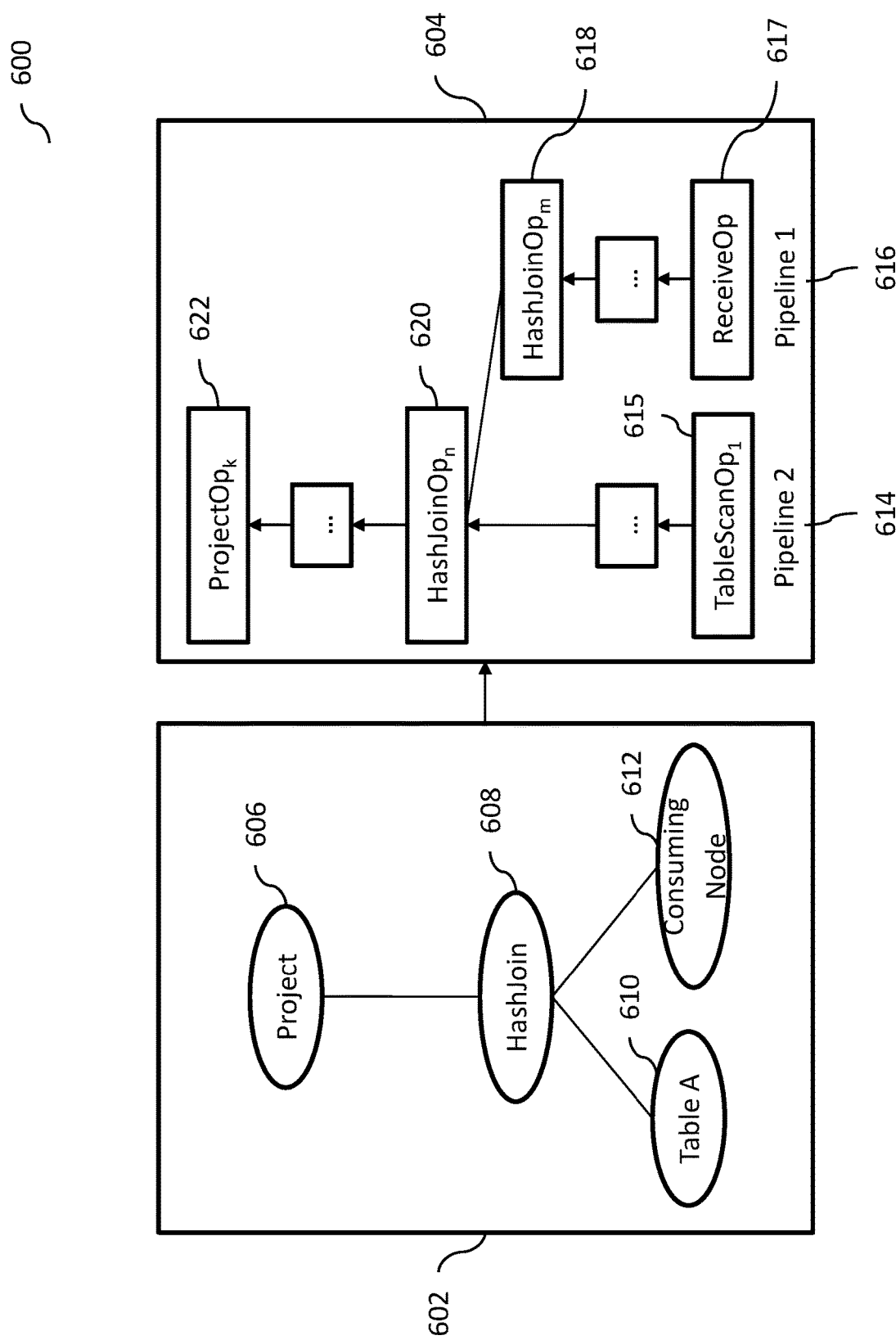
FIG. 6 illustrates an exemplary process for generating a distributed query executable plan for the root plan fragment, according to some implementations of the current subject matter.

FIG. 6 illustrates an exemplary process 600 for generating a distributed query executable plan for the root plan fragment 602, according to some implementations of the current subject matter. The process 600 may be used to generate executable plan 604 for the root plan fragment 602. Similar to FIGS. 4-5, the root plan fragment 602 may include a project root node 606, a HashJoin node 608, a Table A node 610, and a data consuming node 612 (e.g., formed from the relation node 408, as shown in FIG. 4).

The plan 604 may be configured to include one or more pipelines, e.g., pipeline 614 and pipeline 616. The pipeline 616 may be configured to start with a receiving operator (e.g., ReceiveOp) 617 that may be configured to indicate that data will be produced from another location (e.g., location 504 shown in FIG. 5). The pipeline 616 may be configured to continue to the join operation (e.g., HashJoinOp) 618. As can be understood, there can be several operations that may be executed in pipeline 616.

The pipeline 614 may be configured to correspond to the Table A 610 processes and may be configured to start with a scan operator (e.g., TableScanOp) 615. The results of the pipeline 616 may be joined with the results of scanning of Table A using a join operator (e.g., HashJoinOp) 620, and passed along to the root node operator (e.g., ProjectOp) 622.

Referring back to FIG. 2, at 212, the plan fragments (e.g., root and non-root plan fragments) may be stored in a root executable plan. In particular, the non-root plan fragments may be saved in the root executable plan for transmission to target location, at 214.

At 214, all plan fragments may be transmitted to a target location. In some exemplary, non-limiting implementations, the non-root plan fragments may, for example, be serialized into json string format. Root location (e.g., location 502 shown in FIG. 5) may be configured to transmit a json string of a plan fragment through network request to each location, respectively.

At 216, executable plan for each plan fragment may be generated at its target location. When the target location receives a plan fragment, it will de-serialize the received json string format into the algebra tree representation. Then, the target location may be configured to trigger a process of generating executable plan from the algebra tree, at 220. The executable plan may be cached at the target location for later execution.

Figure 7:
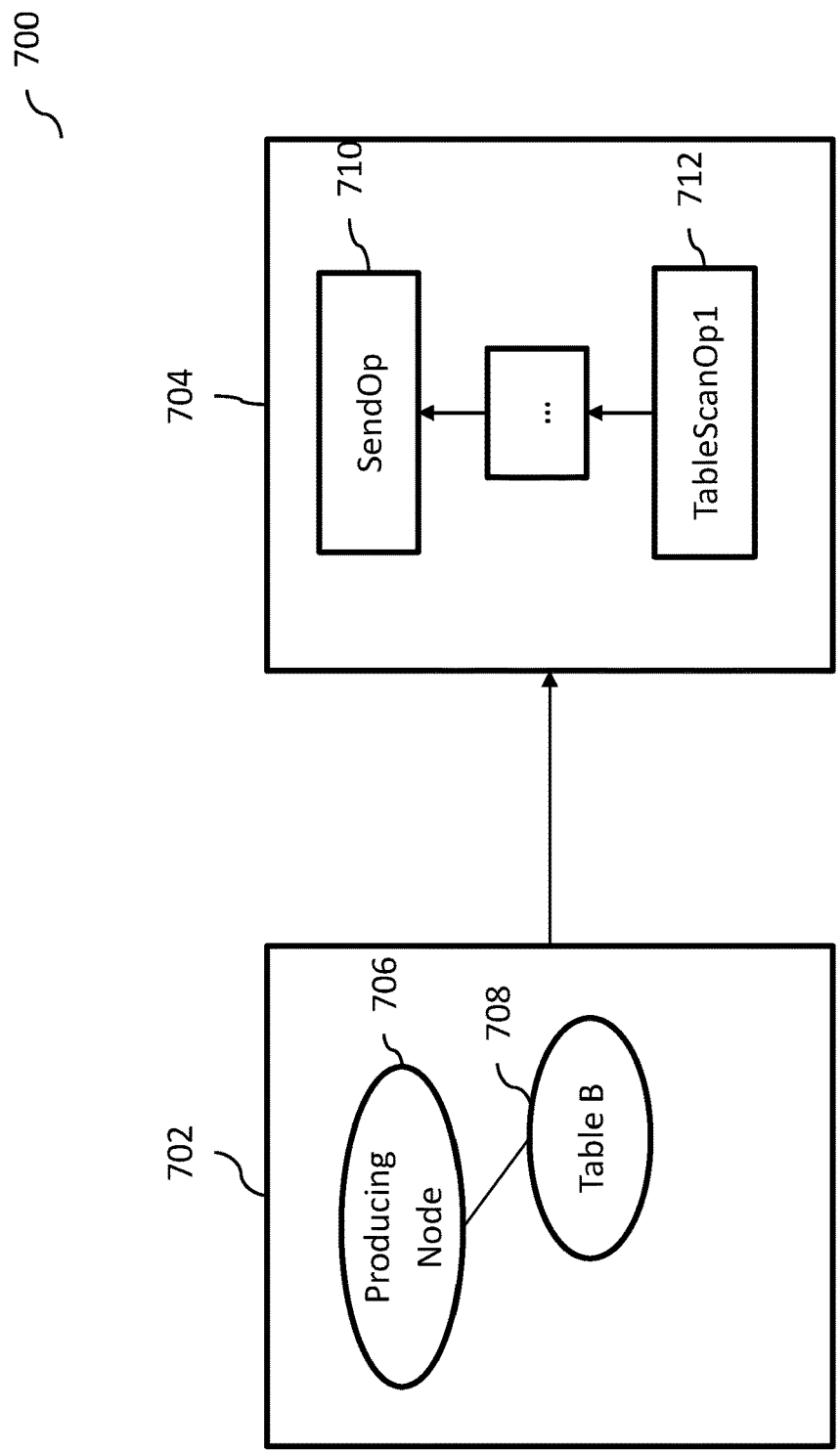
FIG. 7 illustrates an exemplary process for generating an executable plan for a non-root plan fragment, according to some implementations of the current subject matter.

FIG. 7 illustrates an exemplary process 700 for generating an executable plan 704 for a non-root plan fragment 702, according to some implementations of the current subject matter. The non-root plan fragment 702 may be configured to include a data producing node 706 that may be linked to a Table B 708. The executable plan 704 may be configured to include one or more table scan operations (e.g., TableScanOp1) 712 and a transmit (e.g., SendOp) operation 710. The transmit operation 710 may be configured to transmit or send data to the corresponding receive operation 617 (as shown in FIG. 6) for consumption by the consuming node 612 (as shown in FIG. 6).

Once the executable query plan has been generated and cached, its execution may be triggered and controlled by the system 100 (as shown in FIG. 1). FIG. 8 illustrates an exemplary process 800 for triggering generated executable query plan. At 802, the executable query plan that has been generated in accordance with the discussion of FIGS. 1-7 above may be provided. The system 100 may be configured to determine whether the provided plan is a distributed plan, at 804. If not, then the system 100 may be configured to trigger execution of a local query plan, at 806, with results being fetched, at 812.

If, at 804, the system 100 determines that the received executable query plan is a distributed plan, then the system 100 may be configured to transmit a request to trigger asynchronous execution of each non-root "leaf node" or fragment of the provided distributed executable query plan, at 808. In some implementations, each non-root leaf plan fragment may correspond to any non-root plan fragment that does not include any receiving operations (e.g., ReceiveOp, as discussed above), for example, plan fragment 702 having an executable plan 704, as shown in FIG. 7. The execution of the non-root plan fragment may be triggered by root plan (e.g., root plan fragment 602 as shown in FIG. 6). Execution of any non-root plan or non-leaf plan fragments that include one or more receiving operation will not be triggered by the root plan. Instead, execution of such non-root plan fragments may be triggered at a later time when a remote transmitting operation (e.g., SendOp) begins to transmit data to the ReceiveOp inside that non-leaf plan fragment.

Execution of each plan fragment in the distributed executable plan may be configured to follow the same pipeline execution model similar to any local executable plan pipeline. For example, the execution may proceed from execution of a first pipeline to the last pipeline where results may be fetched (e.g., operation 812, as shown in FIG. 8). The pipelines may be executed in a predetermined order. Moreover, operators within each pipeline may also be configured to be executed in a particular order.

FIG. 9 illustrates an exemplary process 900 for execution data receiving and data transmission operations during execution of a distributed executable query plan, according to some implementations of the current subject matter. The data receiving (e.g., ReceiveOp) and data transmitting (e.g., SendOp) may be configured to coordinate pushing of data from data transmission location to data receiving location through a network between plan fragments. In some exemplary implementations, the ReceiveOp operator may be a pipeline start operator and may be configured to receive data from one or more remote SendOp operator. Once the ReceiveOp operator pipeline is activated for execution and data has arrived from the remote SendOp operator, the ReceiveOp operator may be configured to initiate data push to the next operator in the pipeline. The SendOp operator may be a pipeline end operator and may be configured to transfer data, that the previous operator may have pushed to it, to the ReceiveOp operator in a remote location.

Referring to FIG. 9, the process 900 may be configured to be executed between a root plan fragment 902 and a leaf plan fragment 904. The root plan fragment 902 may be configured to include one or more root project operator nodes 920 (e.g., ProjectOp$_k$), one or more join operator nodes 918 (e.g., HashJoinOp$_n$), a first execution pipeline 908 for receiving data from the leaf node 904, and a second execution pipeline 906 for transmitting data for joining to the joining operator nodes 918. The pipeline 908 may include one or more receiving operator nodes 914 (e.g., ReceiveOp) and one or more joining operator nodes 916 (e.g., HashJoinOp$_m$). The pipeline 906 may be include one or more table scanning operators 912 (e.g., TableScanOp$_1$) that may be configured to transmit data for joining at the node 918.

The leaf plan fragment 904 may be configured to include an execution pipeline 910 that may be configured to include one or more table scanning operators nodes 922 (e.g., TableScanOp$_1$) and one or more transmission operator nodes 924 (e.g., SendOp).

The process 900 may be configured to be initiated by the root plan fragment 902 by triggering execution of the leaf plan fragment 904, at 901. Once the execution of the leaf plan fragment 904 is triggered, execution of the pipeline 910 of that fragment may be triggered, at 903. The node 922 may begin transmitting or pushing data to the data transmission node 924 for further transmission to the root node 902, at 905. The node 924 may then transmit data to one or more receiving nodes 914 of the root plan fragment 902, at 907.

The receiving node 914 may be configured to receive the data that has been pushed to it by the transmission node 924. The node 914 may then cache the data when its pipeline 908 becomes active (e.g., starts ordered execution of operators contained within the pipeline). Alternatively, or in addition to, the node 914 may push the data and/or cache the data until the time when pipeline becomes active.

Referring back to FIG. 8, at 810, the system 100 may be configured to execute the distributed root plan and generate results for fetching, at 812. FIG. 10 illustrates an exemplary process 1000 for executing a distributed root plan, according to some implementations of the current subject matter. In some implementations, the distributed root plan may include one or more receiving operations (e.g., ReceiveOp). When the root plan is triggered, the system 100 may be begin execution of the plan from its first pipeline until it reaches a pipeline start of the receiving operations (e.g., ReceiveOp). The system 100 may then pause execution until data is received from transmitting operation (e.g., SendOp) from a remote location. Once the data is received, the receiving operation (e.g., ReceiveOp) pipeline may continue to execute until it reaches to another pipeline start that may require receipt of data (e.g., another ReceiveOp pipeline) and/or reaches a result data fetch pipeline.

At 1002, a list of the data receiving operations of the executable root plan may be determined, where the receiving operations may be arranged in a predetermined order in the list. Once the list of the receiving operations is determined, one of the receiving operation's pipelines may be selected for execution, at 1004. The system 100 may then begin execution of the selected receiving operation's pipeline.

At 1006, the system 100 may be configured to determine whether the end of the list of the data receiving operations has been reached (i.e., all receiving operations' pipelines on the list have been executed). If so, results of the executable query plan may be generated and/or fetched, at 1016.

If there are receiving operations' pipelines on the list that have not yet been executed, the system 100 may be configured to triggering execution of data receiving operation's pipeline until all operators in that receiver pipeline have been executed, i.e., the end of that receiving pipeline is reached, at 1008. At that point, the system 100 may be configured to pause execution of the plan, at 1010. The system 100 may be configured to wait until the data is received from a remote location that may be sent by the remote location's transmitting operation (e.g., SendOp), and continue execution of the receiving pipeline until all data in that pipeline is pushed through.

At 1012, once the data has been received by the receiving operation's pipeline, a notification may be transmitted to the transmitting operation at the remote location that the receiving operation's pipeline has received all requisite data. At that point, the system 100 may be configured to trigger execution of the next pipeline, at 1014, and the processing may return to 1004.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 11:
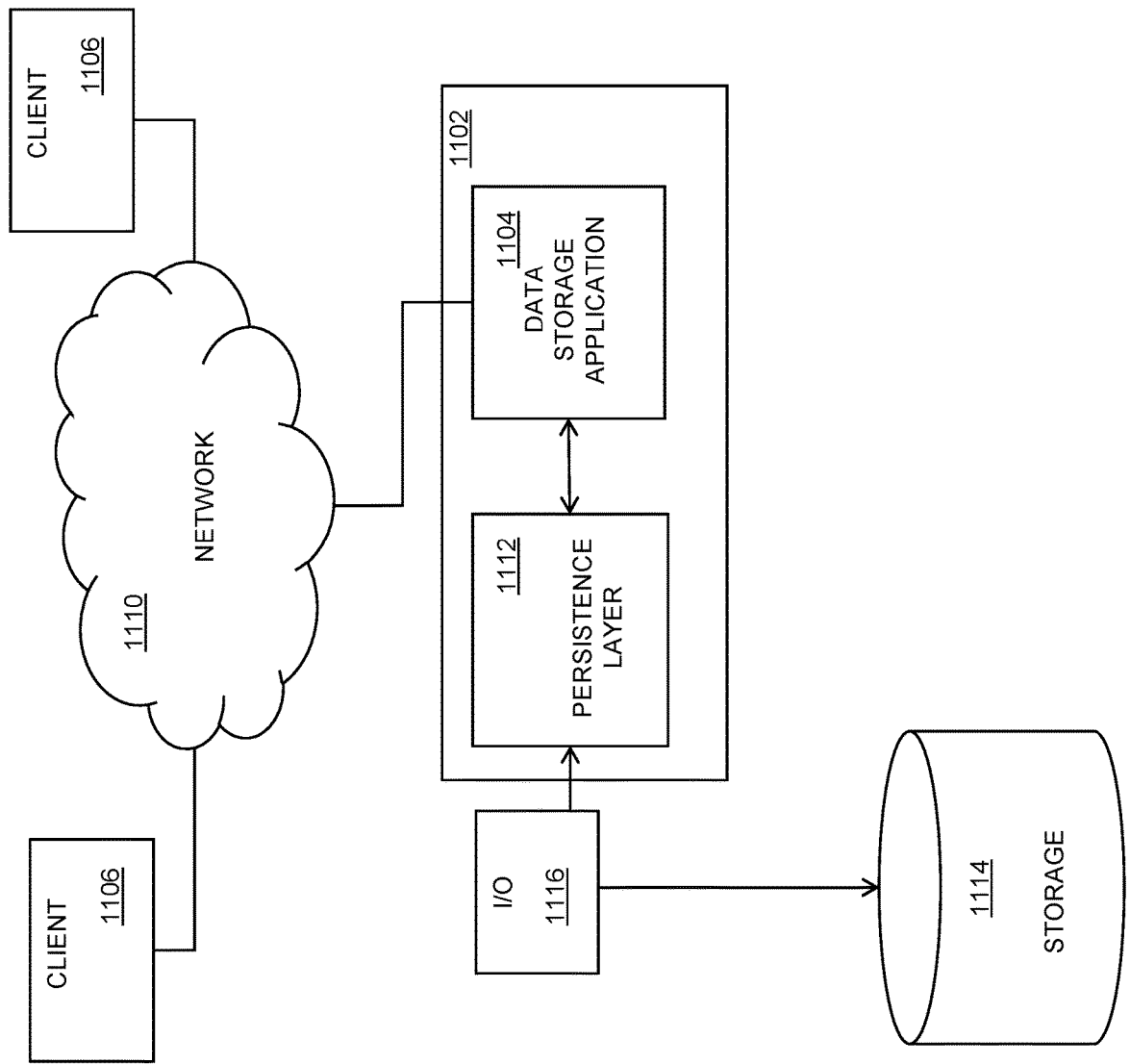
FIG. 11 is a diagram illustrating an exemplary system including a data storage application, according to some implementations of the current subject matter.

FIG. 11 illustrates an exemplary system 1100 in which a computing system 1102, which may include one or more programmable processors that may be collocated, linked over one or more networks, etc., executes one or more modules, software components, or the like of a data storage application 1104, according to some implementations of the current subject matter. The data storage application 1104 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 1102 as well as to remote users accessing the computing system 1102 from one or more client machines 1106 over a network connection 1110. One or more user interface screens produced by the one or more first modules may be displayed to a user, either via a local display or via a display associated with one of the client machines 1106. Data units of the data storage application 1104 may be transiently stored in a persistence layer 1112 (e.g., a page buffer or other type of temporary persistency layer), which may write the data, in the form of storage pages, to one or more storages 1114, for example via an input/output component 1116. The one or more storages 1114 may include one or more physical storage media or devices (e.g. hard disk drives, persistent flash memory, random access memory, optical media, magnetic media, and the like) configured for writing data for longer term storage. It should be noted that the storage 1114 and the input/output component 1116 may be included in the computing system 1102 despite their being shown as external to the computing system 1102 in FIG. 11.

Data retained at the longer term storage 1114 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 12:
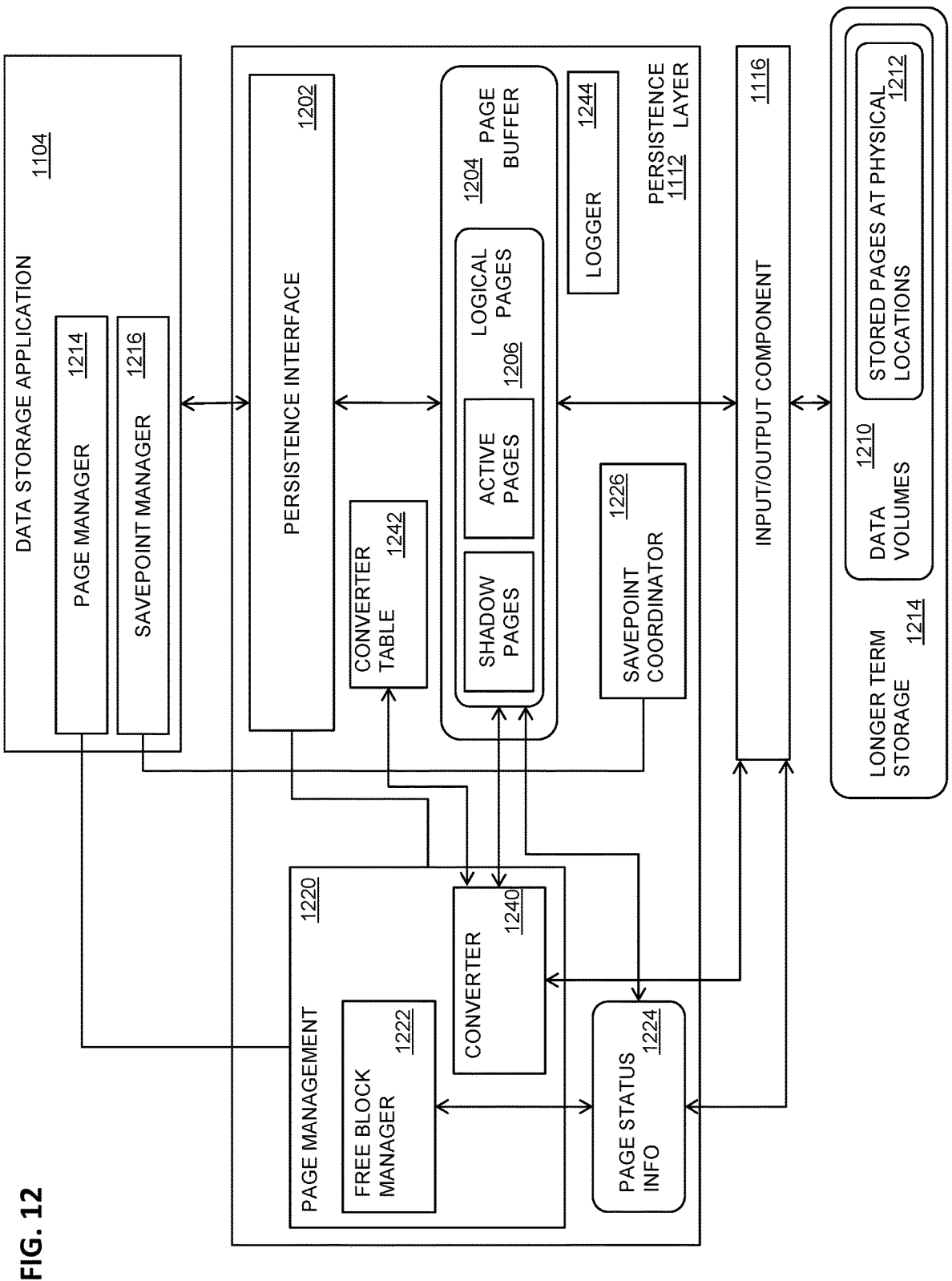
FIG. 12 is a diagram illustrating details of the system of FIG. 11.

FIG. 12 illustrates exemplary software architecture 1200, according to some implementations of the current subject matter. A data storage application 1104, which may be implemented in one or more of hardware and software, may include one or more of a database application, a network-attached storage system, or the like. According to at least some implementations of the current subject matter, such a data storage application 1104 may include or otherwise interface with a persistence layer 1112 or other type of memory buffer, for example via a persistence interface 1202. A page buffer 1204 within the persistence layer 1112 may store one or more logical pages 1206, and optionally may include shadow pages, active pages, and the like. The logical pages 1206 retained in the persistence layer 1112 may be written to a storage (e.g. a longer term storage, etc.) 1114 via an input/output component 1116, which may be a software module, a sub-system implemented in one or more of software and hardware, or the like. The storage 1114 may include one or more data volumes 1210 where stored pages 1212 are allocated at physical memory blocks.

In some implementations, the data storage application 1104 may include or be otherwise in communication with a page manager 1214 and/or a savepoint manager 1216. The page manager 1214 may communicate with a page management module 1220 at the persistence layer 1112 that may include a free block manager 1222 that monitors page status information 1224, for example the status of physical pages within the storage 1114 and logical pages in the persistence layer 1112 (and optionally in the page buffer 1204). The savepoint manager 1216 may communicate with a savepoint coordinator 1226 at the persistence layer 1112 to handle savepoints, which are used to create a consistent persistent state of the database for restart after a possible crash.

In some implementations of a data storage application 1104, the page management module of the persistence layer 1112 may implement a shadow paging. The free block manager 1222 within the page management module 1220 may maintain the status of physical pages. The page buffer 1204 may include a fixed page status buffer that operates as discussed herein. A converter component 1240, which may be part of or in communication with the page management module 1220, may be responsible for mapping between logical and physical pages written to the storage 1114. The converter 1240 may maintain the current mapping of logical pages to the corresponding physical pages in a converter table 1242. The converter 1240 may maintain a current mapping of logical pages 1206 to the corresponding physical pages in one or more converter tables 1242. When a logical page 1206 is read from storage 1114, the storage page to be loaded may be looked up from the one or more converter tables 1242 using the converter 1240. When a logical page is written to storage 1114 the first time after a savepoint, a new free physical page is assigned to the logical page. The free block manager 1222 marks the new physical page as "used" and the new mapping is stored in the one or more converter tables 1242.

The persistence layer 1112 may ensure that changes made in the data storage application 1104 are durable and that the data storage application 1104 may be restored to a most recent committed state after a restart. Writing data to the storage 1114 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 1244 may also be included to store the changes made to the data of the data storage application in a linear log. The logger component 1244 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 1244 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 1112 may use a combination of undo log entries (from one or more logs) and shadow paging.

The persistence interface 1202 may handle read and write requests of stores (e.g., in-memory stores, etc.). The persistence interface 1202 may also provide write methods for writing data both with logging and without logging. If the logged write operations are used, the persistence interface 1202 invokes the logger 1244. In addition, the logger 1244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1244. For an entry of type "update", for example, this would be the identification of the affected record and the after image of the modified data.

When the data application 1104 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 1244 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 1244 may write a database log (or simply referred to herein as a "log") sequentially into a memory buffer in natural order (e.g., sequential order, etc.). If several physical hard disks/storage devices are used to store log data, several log partitions may be defined. Thereafter, the logger 1244 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 1104 may use shadow paging so that the savepoint manager 1216 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 13:
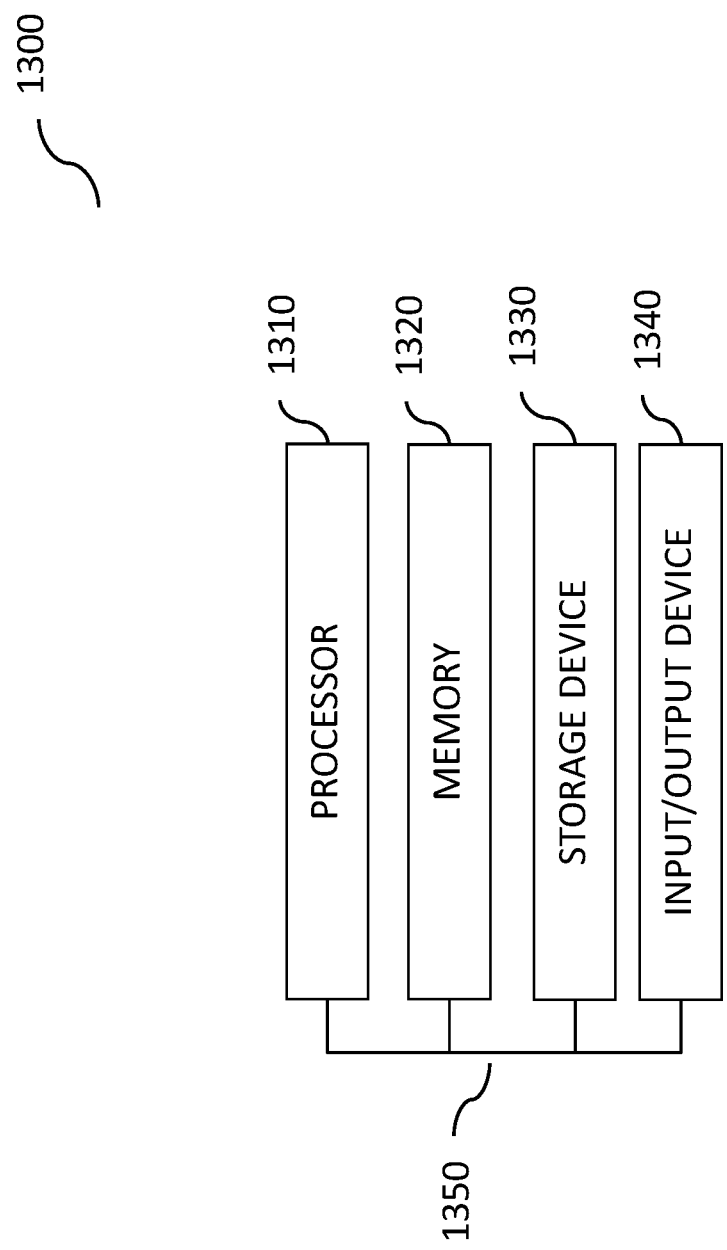
FIG. 13 is an exemplary system, according to some implementations of the current subject matter.

In some implementations, the current subject matter may be configured to be implemented in a system 1300, as shown in FIG. 13. The system 1300 may include a processor 1310, a memory 1320, a storage device 1330, and an input/output device 1340. Each of the components 1310, 1320, 1330 and 1340 may be interconnected using a system bus 1350. The processor 1310 may be configured to process instructions for execution within the system 1300. In some implementations, the processor 1310 may be a single-threaded processor. In alternate implementations, the processor 1310 may be a multi-threaded processor. The processor 1310 may be further configured to process instructions stored in the memory 1320 or on the storage device 1330, including receiving or sending information through the input/output device 1340. The memory 1320 may store information within the system 1300. In some implementations, the memory 1320 may be a computer-readable medium. In alternate implementations, the memory 1320 may be a volatile memory unit. In yet some implementations, the memory 1320 may be a non-volatile memory unit. The storage device 1330 may be capable of providing mass storage for the system 1300. In some implementations, the storage device 1330 may be a computer-readable medium. In alternate implementations, the storage device 1330 may be a floppy disk device, a hard disk device, an optical disk device, a tape device, non-volatile solid state memory, or any other type of storage device. The input/output device 1340 may be configured to provide input/output operations for the system 1300. In some implementations, the input/output device 1340 may include a keyboard and/or pointing device. In alternate implementations, the input/output device 1340 may include a display unit for displaying graphical user interfaces.

Figure 14:
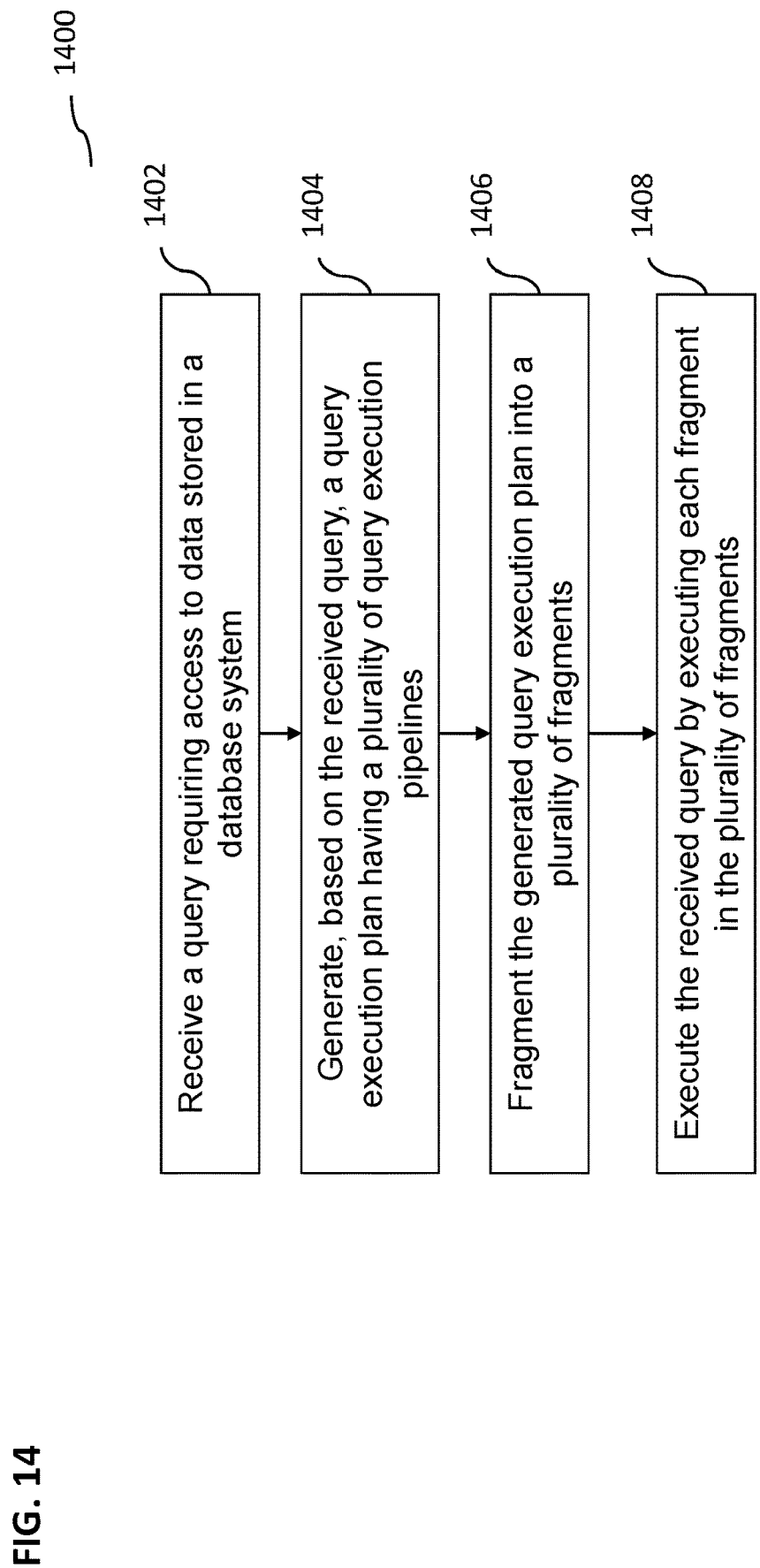
FIG. 14 is an exemplary method, according to some implementations of the current subject matter.

FIG. 14 illustrates an exemplary method 1400 for generating a query executable plan, according to some implementations of the current subject matter. At 1402, a query requiring access to data stored in a database system may be received. For example, the query may be received by the system 100 shown in FIG. 1. At 1404, using the received query, a query execution plan may be generated. The plan may include a plurality of query execution pipelines (e.g., as shown in FIG. 6 et seq.). Each query execution pipeline in the plurality of query execution pipelines may be configured to execute a plurality of operations in a predetermined order associated with each query execution pipeline.

At 1406, the generated query execution plan may be fragmented into a plurality of fragments (as for example is shown in FIGS. 2, 5-7). Each fragment may include one or more query execution pipelines (e.g., pipelines 614, 616 as shown in FIG. 6 and others) in the plurality of query execution pipelines.

At 1408, the received query may be executed by executing each fragment in the plurality of fragments.

In some implementations, the current subject matter may include one or more of the following optional features. The received query may require access to the data stored in different locations in the database system. One or more locations in the database system may be considered a data consuming location and one or more other locations in the database system may be considered a data producing location. One or more locations may include one or more nodes in a distributed database system.

In some implementations, the plurality of fragments may include a root fragment and one or more non-root fragments. The root fragment may be configured to be executed at the data consuming location of the database system and may be further configured to receive data resulting from execution of the non-root fragments at the data producing location of the database system.

In some implementations, execution of the root fragment may be configured to trigger execution of the non-root fragments. Further, execution of a query execution pipeline of the root fragment may include executing a receiving operator to receive data queried by the received query from one or more non-root fragments. Moreover, execution of a query execution pipeline of the non-root fragment may include executing a transmitting operator to transmit data queried by the received query to the root fragment. In some implementations, execution of a query execution pipeline of the non-root fragment may include executing a receiving operator to receive data queried by the received query from one or more non-root fragments. Additionally, each non-root fragment may be configured to be executed asynchronously.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving a query requiring access to data stored in a database system;
generating, based on the received query, a query execution plan having a plurality of execution pipelines, each query execution pipeline in the plurality of query execution pipelines is configured to execute a plurality of operations in a predetermined order associated with each query execution pipeline;
fragmenting the generated query execution plan into a plurality of fragments, each fragment having one or more query execution pipelines in the plurality of query execution pipelines;
wherein a first fragment of the plurality of fragments has a first query execution pipeline having a receiving node configured to receive data from at least a first transmitting node in a second fragment of the plurality of fragments;
wherein the receiving node is a configured to cache received data while its corresponding query execution pipeline is not active during execution of the query execution plan;
wherein the first transmitting node is configured to transmit data to at least the receiving node in the first fragment;
wherein execution of at least one subsequent operation of the first query execution pipeline is paused until data is received by the receiving node from the first transmitting node;
the query execution pipelines being selected for execution based on an order of execution of one or more receiving nodes executed on the first fragment; and
executing the received query by executing each fragment in the plurality of fragments.

2. The method according to claim 1, wherein the received query requires access to the data stored in different locations in the database system, wherein one or more locations in the database system is a data consuming location and one or more another locations in the database system is a data producing location, wherein one or more locations include one or more nodes in a distributed database system.

3. The method according to claim 2, wherein the plurality of fragments include a root fragment and one or more non-root fragments, wherein the root fragment is configured to be executed at the data consuming location of the database system and is configured to receive data resulting from execution of the one or more non-root fragments at the data producing location of the database system.

4. The method according to claim 3, wherein execution of the root fragment is configured to trigger execution of the one or more non-root fragments.

5. The method according to claim 4, wherein execution of a query execution pipeline of the root fragment includes executing a receiving operator to receive data queried by the received query from one or more non-root fragments.

6. The method according to claim 4, wherein execution of a query execution pipeline of the non-root fragment includes executing a transmitting operator to transmit data queried by the received query to the root fragment.

7. The method according to claim 4, wherein execution of a query execution pipeline of the non-root fragment includes executing a receiving operator to receive data queried by the received query from one or more non-root fragments.

8. The method according to claim 4, wherein each non-root fragment is configured to be executed asynchronously.

9. A system comprising:
at least one programmable processor; and
a non-transitory machine-readable medium storing instructions that, when executed by the at least one programmable processor, cause the at least one programmable processor to perform operations comprising:
receiving a query requiring access to data stored in a database system;
generating, based on the received query, a query execution plan having a plurality of execution pipelines, each query execution pipeline in the plurality of query execution pipelines is configured to execute a plurality of operations in a predetermined order associated with each query execution pipeline;
fragmenting the generated query execution plan into a plurality of fragments, each fragment having one or more query execution pipelines in the plurality of query execution pipelines;
wherein a first fragment of the plurality of fragments has a first query execution pipeline having a receiving node configured to receive data from at least a first transmitting node in a second fragment of the plurality of fragments;
wherein the receiving node is a configured to cache received data while its corresponding query execution pipeline is not active during execution of the query execution plan;
wherein the first transmitting node is configured to transmit data to at least the receiving node in the first fragment;
wherein execution of at least one subsequent operation of the first query execution pipeline is paused until data is received by the receiving node from the first transmitting node;
the query execution pipelines being selected for execution based on an order of execution of one or more receiving nodes executed on the first fragment; and
executing the received query by executing each fragment in the plurality of fragments.

10. The system according to claim 9, wherein the received query requires access to the data stored in different locations in the database system, wherein one or more locations in the database system is a data consuming location and one or more another locations in the database system is a data producing location, wherein one or more locations include one or more nodes in a distributed database system.

11. The system according to claim 10, wherein the plurality of fragments include a root fragment and one or more non-root fragments, wherein the root fragment is configured to be executed at the data consuming location of the database system and is configured to receive data resulting from execution of the one or more non-root fragments at the data producing location of the database system.

12. The system according to claim 11, wherein execution of the root fragment is configured to trigger execution of the one or more non-root fragments.

13. The system according to claim 12, wherein execution of a query execution pipeline of the root fragment includes executing a receiving operator to receive data queried by the received query from one or more non-root fragments.

14. The system according to claim 12, wherein execution of a query execution pipeline of the non-root fragment includes executing a transmitting operator to transmit data queried by the received query to the root fragment.

15. The system according to claim 12, wherein execution of a query execution pipeline of the non-root fragment includes executing a receiving operator to receive data queried by the received query from one or more non-root fragments.

16. The system according to claim 12, wherein each non-root fragment is configured to be executed asynchronously.

17. A computer program product comprising a non-transitory machine-readable medium storing instructions that, when executed by at least one programmable processor, cause the at least one programmable processor to perform operations comprising:
receiving a query requiring access to data stored in a database system;
generating, based on the received query, a query execution plan having a plurality of execution pipelines, each query execution pipeline in the plurality of query execution pipelines is configured to execute a plurality of operations in a predetermined order associated with each query execution pipeline;
fragmenting the generated query execution plan into a plurality of fragments, each fragment having one or more query execution pipelines in the plurality of query execution pipelines;
wherein a first fragment of the plurality of fragments has a first query execution pipeline having a receiving node configured to receive data from at least a first transmitting node in a second fragment of the plurality of fragments;
wherein the receiving node is a configured to cache received data while its corresponding query execution pipeline is not active during execution of the query execution plan;
wherein the first transmitting node is configured to transmit data to at least the receiving node in the first fragment;
wherein execution of at least one subsequent operation of the first query execution pipeline is paused until data is received by the receiving node from the first transmitting node;
the query execution pipelines being selected for execution based on an order of execution of one or more receiving nodes executed on the first fragment; and
executing the received query by executing each fragment in the plurality of fragments.

18. The computer program product according to claim 17, wherein the received query requires access to the data stored in different locations in the database system, wherein one or more locations in the database system is a data consuming location and one or more another locations in the database system is a data producing location, wherein one or more locations include one or more nodes in a distributed database system.

19. The computer program product according to claim 18, wherein the plurality of fragments include a root fragment and one or more non-root fragments, wherein the root fragment is configured to be executed at the data consuming location of the database system and is configured to receive data resulting from execution of the one or more non-root fragments at the data producing location of the database system.

20. The computer program product according to claim 19, wherein execution of the root fragment is configured to trigger execution of the one or more non-root fragments.

* * * * *